United States Patent [19]

Ahonen

[11] Patent Number: 5,430,662
[45] Date of Patent: Jul. 4, 1995

[54] LASER PROJECTION SYSTEM FOR TRUSS MANUFACTURING

[75] Inventor: Seppo Ahonen, Keitele, Finland
[73] Assignee: SEPA -- Group Ltd., Keitele, Finland
[21] Appl. No.: 141,284
[22] Filed: Oct. 22, 1993
[51] Int. Cl.$^6$ .............................................. G06F 17/50
[52] U.S. Cl. ...................................... 364/512; 353/28; 364/468
[58] Field of Search ..................... 353/28; 364/468, 512

[56] References Cited
U.S. PATENT DOCUMENTS 4,739,487 4/1988 Bonnet et al. ................... 364/474.08
5,341,183 8/1994 Dorsey-Palmeteer ................ 353/28

Primary Examiner—Edward R. Cosimano
Attorney, Agent, or Firm—Laff, Whitesel, Conte and Saret, Ltd.

[57] ABSTRACT

The need for complex trusses has prompted the creation of a laser enhanced design system. Lasers mounted on the ceiling project precise images onto a gentry table below. The initial truss design is produced using a virtually any CAD system in conjunction with a work station or PC-microcomputer. A standard PC-microcomputer running MS-DOS software is used to control the laser system. The files required for the laser system are automatically created during the designing phase. The assembly line operator uses a mouse or keyboard to control and select the projected images while a worker places the truss elements over the projected images.

12 Claims, 3 Drawing Sheets

LASER PROJECTION SYSTEM FOR TRUSS MANUFACTURING

BACKGROUND OF THE INVENTION

This invention relates to the manufacture of roof trusses and more particularly, to a process and system for quickly assembling the components of a roof truss on a gentry table or other assembly surface.

An increase in the use of more complex and varied roof constructions has created manufacturing problems and greatly increased production times. Today, a single roof order may require the modeling and manufacture of trusses with many different shapes and dimensions. Complex roof constructions demand stricter tolerances in the positioning of nail plates and webs. In truss construction previous to the invention here, the typical tolerances for nail plate locations were $+/-0.4$ inches, which are often inadequate for the complex and varied roof designs demanded in modern construction. Consequently, the modeling time has grown in relation to overall production time. In the past, the assembly of one truss including the positioning and pressing of nail plates may typically have required less than ten minutes, but the modeling and the manufacture of the first truss for each complex truss design took many times longer, depending on the number of workers involved.

SUMMARY OF THE INVENTION

Better productivity and quality were the primary reasons behind the development of the invention. The invention improves the efficiency of truss modeling and manufacture, thereby reducing production times, Furthermore, the quality of the truss product is raised since the actual tolerances of dimensions and nail plate locations are smaller than the set tolerances.

Using CAD-CAM design software, the desired truss design is created on a computer work station. Once the design is completed on the work station, computer files including instructions for the exact shape and dimensions of the desired truss are transmitted to another computer which controls at least one and preferably two laser light projectors mounted above a gentry table. The projectors are then directed by the laser control computer to project images of the bottom nail plates, lumber elements, and top nail plates on the gentry table, where workers can place the actual nail plates and lumber elements over their respective images and fasten them together. The entire projection system is optimized by the control computer, which means that the images of adjacent nail plates and lumber elements are projected in rapid succession, rather than projecting images of one corner nail plate and then an opposite corner nail plate. Optimization produces what appears to an observer as a nearly continuous image of the desired components, and it reduces blinking or "jumping" of the light and the time needed for the light projector to display all of the desired images.

The actual construction involves three stages. During the first stage, the appropriately sized lower nail plates are projected onto the gentry table in the proper location for the desired truss. The worker on the truss assembly line mounts the lower nail plate jigs or places the lower nail plates over their images on the gentry table. In the second stage, images of the appropriately sized lumber elements, including webs and chords, are projected in their proper locations, and the worker mounts the web and chord jigs or places the webs and chords over their respective images. In the third stage, the images of the appropriately sized upper nail plates are projected onto the partially-assembled truss in their proper locations, and the worker mounts the upper nail plate jigs or places the upper nail plates over their images. All of the components are then fastened together with a travelling gantry press. If only the jig of the truss is thus made, the actual production of the truss may begin thereafter.

BRIEF DESCRIPTION OF THE DRAWINGS

The above mentioned and other features of the invention will become more apparent and the invention itself will be best understood by reference to the following description of a preferred embodiment of the invention taken in conjunction with the accompanying drawings, in which.

DETAILED DESCRIPTION OF THE INVENTION

Figure 1:
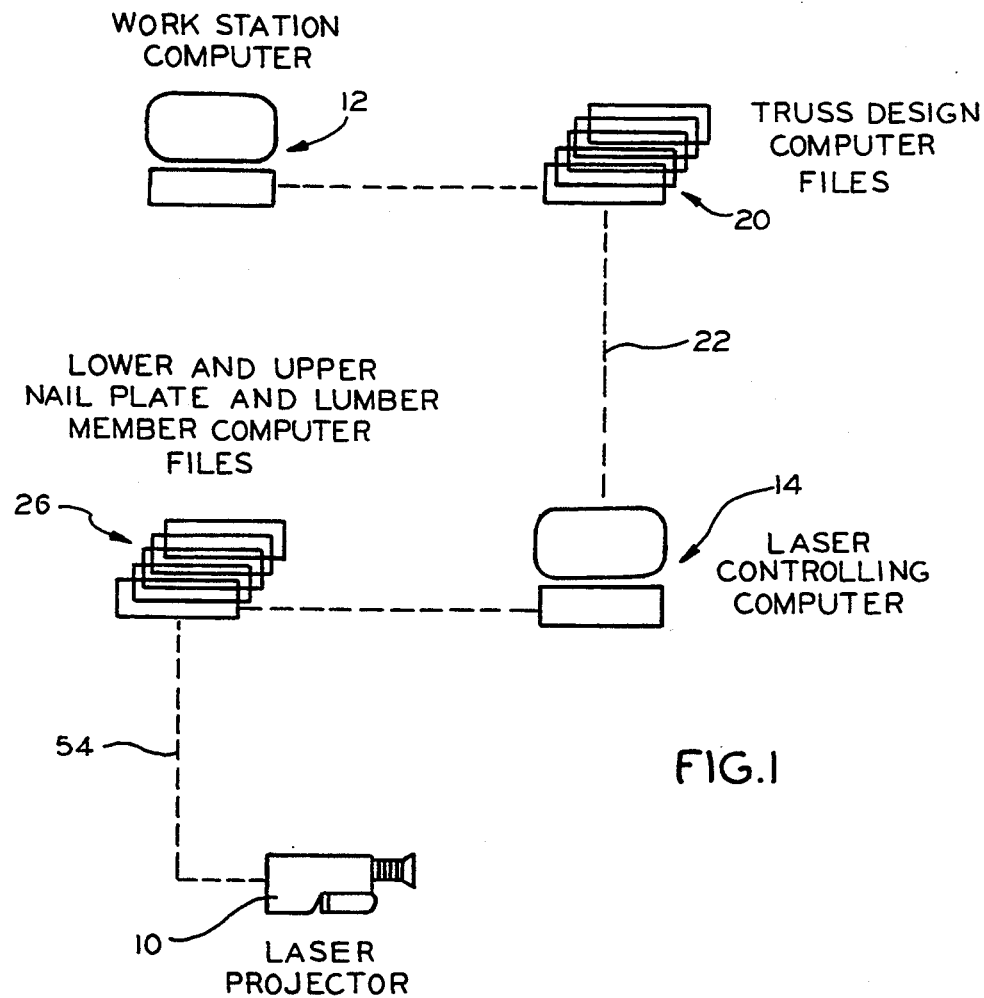
FIG. 1 is a schematic diagram of the computer components and a laser projection unit of the invention.
Figure 2:
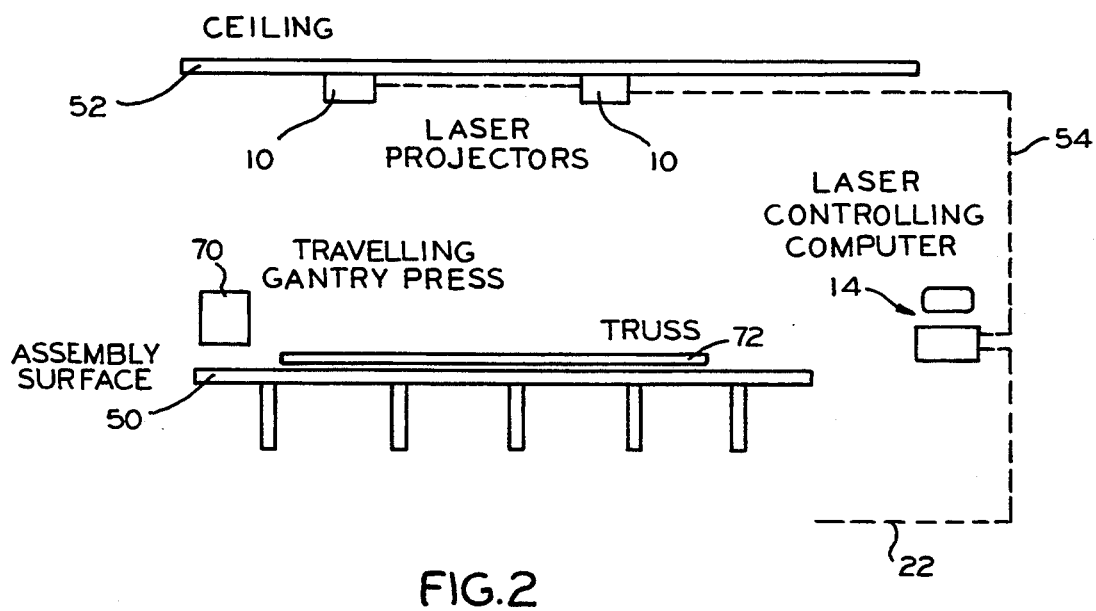
FIG. 2 is a schematic diagram showing the laser projection units connected to the laser control computer and a truss being assembled on a gentry table.

As shown in FIGS. 1 and 2, a system for truss manufacturing according to the invention includes at least one and preferably two laser projectors 10, one work station computer 12 including mouse, monitor, and operating system software, and one laser- controlling computer 14 including VGA monitor, mouse, operating system software, and laser-controlling software, and cabling 22 between them. The initial truss design is created preferably using the MEDUSA CAD-program in conjunction with a SUN work station 12. This software is used by a worker to design the geometry of the truss, calculate sizes and the capacities of the members, and analyze the cost of the designed truss. The desired truss design appears on the screen, and coordinates for the design of each truss component pictured on the screen are assigned by the work station computer 12. Drawings of the truss and the computer files containing the above-listed information are automatically produced during this design phase. The files 20 generated by this software may also be generated by other design systems, such as AUTO-CAD and MicroStation. The files contain normal HPGL-commands (Hewlett Packard Graphics Language).

The work station 12 is connected by Ethernet-cable 22 or by using diskettes to the hard disk of the laser controlling PC computer server 14. The calculations and drawings are also printed from the server.

Figure 3:
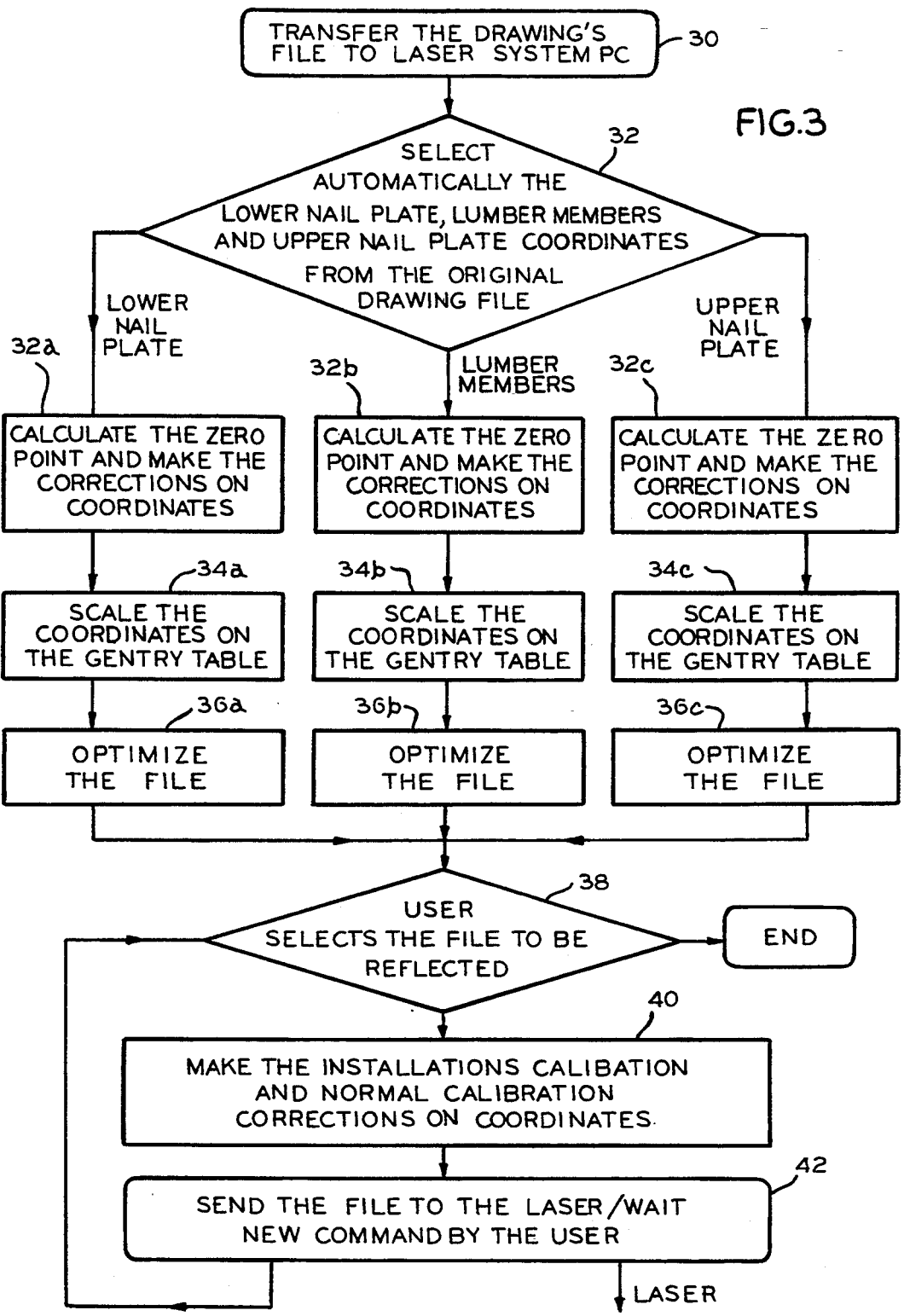
FIG. 3 is a flow chart of the computer program which converts the specifications for the truss design created on the work station to instructions sent to the laser projections units.
Figure 4:
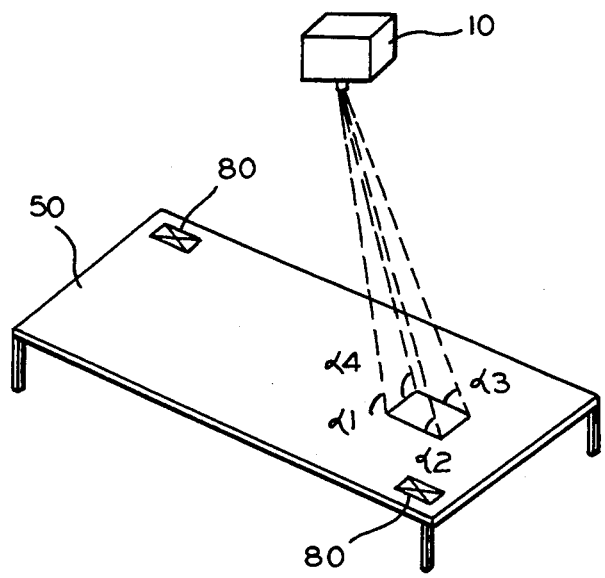
FIG. 4 is a perspective view of a laser projection unit and a gentry table with the image of a truss component projected thereon.

It is then necessary to convert the files produced by the work station computer 12 which describe the truss design into instructions directing the laser projectors to project accurate and life-size images of the truss components onto the gentry table. The converting program in the laser-controlling computer 14 performs several steps to accomplish this task, as shown in FIG. 3. First, as shown in step 30, the truss design files 20 are transferred from the work station 12 to the laser-controlling computer 14. At step 32, the converting program in computer 14 automatically selects from files 20 the original coordinates for the lower nail plates, lumber members, and upper nail plates. This part of the conversion process involves the creation of three different files, one for the lower nail plates, one for the lumber members (chords and webs), and one for the upper nail plates. Although the lower and upper nail plates are typically parallel to each other, the lower and upper nail plates are at different locations with respect to the position of the lasers, requiring two different files. For each of these three files, the original coordinates from files 20 must be scaled to match the sizes of the actual truss components to be imaged on the gentry table. To do this for each of these three files, the computer 14 at step 32a (lower nail plate), step 32b (lumber members), and step 32c (upper nail plates) calculates the zero point, or the fixed point on the assembly surface 50, shown as $\alpha1$ in FIG. 4. The real measurements and coordinates of the zero point are known. Then, the remaining coordinates (e.g., $\alpha2$, $\alpha3$, and $\alpha4$) are scaled at steps 34a, 34b, and 34c, so that the three new files contain coordinates for the images 80 to be projected onto the gentry table, and those images correspond in size, shape and location to the actual truss components of an assembled truss.

Each of the three files are optimized at steps 36a, 36b, and 36c, so that images of the nearest nail plates or lumber elements, rather than widely spaced truss components, are projected in rapid succession. This minimizes the time required to project all of the images on the assembly surface and reduces blinking of the images. All three files are then ready for selection by the user.

At step 38, the user selects the lower nail plate file, lumber member file, or upper nail plate file to be projected, with all of the files represented as 26 in FIG. 1. Once a file is selected, the computer makes calibration corrections at step 40 to compensate for the particular installation conditions and the normal environmental conditions. The installation conditions may include, for example, an assembly surface 50 which is not planar but concave or convex. The normal environmental conditions include outside temperature and snow load on the roof, each of which may cause movement of the roof of the building where truss assembly is occurring and, therefore, movement of the ceiling-mounted laser projectors 10. This movement, unless compensated and corrected by computer 14, would alter the location and size of the truss images projected on the assembly surface and jeopardize the proper assembly of the truss. The normal environmental corrections are determined with the help of pairs of diode or photo-electric sensors located on the gentry table. Pairs of sensors, rather than single sensors, are preferred to check for possible rotation of the laser projectors relative to their previous positions, due to temperature or snowload changes.

If the laser light directed at the diode sensors is actually detected by them, the diode sensors signal the laser controlling computer 14 that the roof-mounted laser projection units 10 are properly positioned relative to the gentry table 50. If the diode sensors do not detect the laser light, indicating that the roof has shifted due to temperature or snowload, the laser projection units first direct the light at the coordinates for the diode sensors last known to the laser controlling computer 14. Then, the laser light is moved until the diode sensors again detect the laser light. The distance by which the laser light must be moved in order to be detected by the diode sensors indicates to the laser controlling computer 14 the distance that the roof has shifted, because the position of the diode sensors is fixed and known. From this distance information, new diode sensor coordinates are assigned in the computer 14 and the truss coordinates in the files 26 can then be corrected to compensate for the shift of the roof. The next time the system is used, the laser light is directed at the last assigned coordinates for the diode sensors.

Once the corrections are made to the applicable file, the file 26 is sent at step 42 to the laser projection units 10 and the lasers are thereby instructed to project images of lower nail plates, lumber members or upper nail plates onto the assembly surface 50. The computer 14 is also ready to accept a new command from the user. When the last file (upper nail plates) is sent to the laser, the computer program "ends." The software controlling the laser units works in the background, so other programs can be run simultaneously.

It is also possible to divide the coordinates for the lumber members into two files, one for the chords and one for the webs. In that case, step 32 involves the creation of four files instead of three (lower nail plates, chords, webs, and upper nail plates). The rest of the process continues in the same manner.

The laser projection system preferably includes two laser light projectors 10 mounted on the ceiling 52, projecting precise images and sizes of both plates and lumber members on gentry table 50 below. The preferred laser components used in the laser units are He-Ne-laser tubes, creating lines sharp enough for use under normal lighting conditions. The laser units are connected to the control computer 14 by signal cables 54. Each laser unit can project an image measuring about 10 feet by 20 feet, and together, two laser units can create an image measuring up to ten feet by forty feet on table 50. Additional laser units can be installed on the assembly line depending on the truss size and the size of the available assembly surface. The theoretical accuracy of the projected image is about 0.01 inches and in practice, the accuracy of the projected image is about 0.05 to 0.07 inches. This accuracy is achieved with the use of the fixed calibration sensors. The projected picture has a scale of 1:1 with that of the manufactured truss.

Figure 5D:
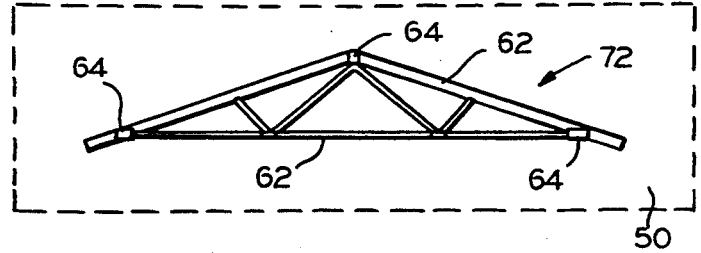
FIG. 5D is a plan view of an assembled truss on a gentry table.
Figure 5A:
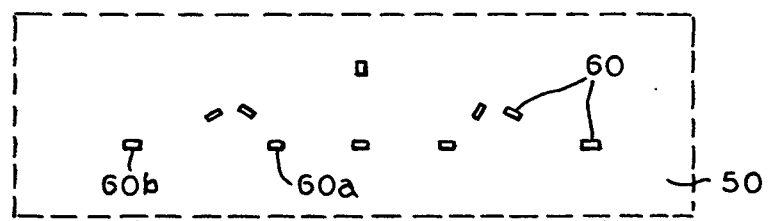
FIG. 5A is a plan view of a gentry table bearing projected images of the lower nail plates.
Figure 5B:
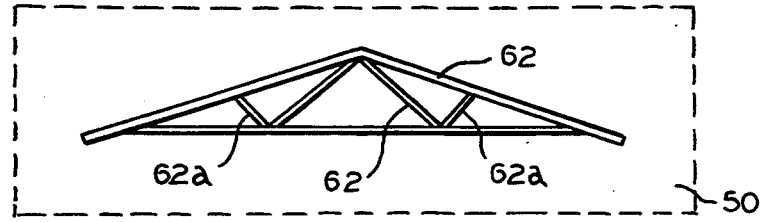
FIG. 5B is a plan view of a gentry table bearing projected images of the chords and webs of a truss.
Figure 5C:
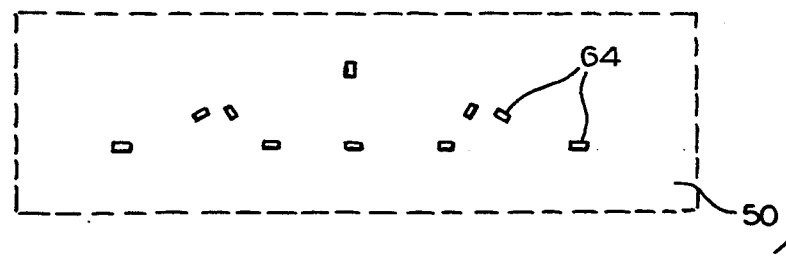
FIG. 5C is a plan view of a gentry table bearing projected images of the upper nail plates.

Desirably, the system is controlled in the plant by an operator using a computer mouse connected to laser controlling computer 14. The operator punches the mouse once, and the dual projectors 10, one handling each half of the truss, first beam down the images of the lower nail plates 60 as shown in FIG. 5A. A worker mounts the lower nail plate jigs 60a or places the lower nail plates 60b in their proper locations. The images show the exact size of the plates 60 as well as their locations so worker errors are eliminated. The next punch of the mouse projects the images of the lumber elements to show their exact size, configuration, and location, as shown in FIG. 5B. The stops are quickly placed by hand. The lumber members 62, typically available from a rear overhead conveyorized cart system (not shown), are also placed at this point. The third punch of the mouse projects the location and size of the upper nail plates 64 for the top locations on the truss, shown in FIG. 5C. The worker mounts the web jigs 62a or places the webs 62. The worker then places the actual upper nail plates 64 in their proper locations. The time needed to project each set of images is only about one second. Once all of the components are in place, it is quick and easy to "scan" or again project images of the components onto the gentry table to check that the jigs or actual components are properly positioned. Using the travelling gantry press 70 (FIG. 2), the worker then assembles the truss components into an assembled truss 72 (FIG. 5D).

The above-described embodiment of the invention is merely one example of a way in which the invention may be carried out. Other ways may also be possible, and are within the scope of the following claims defining the invention.

The claimed invention is:

1. A system for aiding in the assembling of roof trusses on an assembly surface, comprising:
   at least one laser light projector mounted above said assembly surface for projecting images of components of a desired roof truss onto said assembly surface; and
   control means electronically connected to said laser light projector for directing said laser light projector to project an image of said entire desired roof truss onto said assembly surface.

2. The system of claim 1 including two laser light projectors, wherein each of said projectors project the image of one-half of a desired truss onto said assembly surface.

3. The system of claim 1 further comprising design means electronically connected to said control means for designing the roof truss.

4. A process for constructing roof trusses on an assembly surface, comprising the steps of:
   selecting a desired truss design from a number of designs stored in computer memory;
   projecting laser images of various truss components onto said assembly surface in the pattern of the desired truss design, and then placing actual truss components over their respective images on said assembly surface; and
   connecting the truss components together to complete the desired truss.

5. The process of claim 4 wherein the step of projecting laser images includes projecting images having a scale of 1:1 with the actual truss components.

6. The process of claim 4 wherein said roof truss comprises bottom plates, lumber elements, and top plates, and wherein laser images of bottom plates are projected and the actual bottom plates are placed on said assembly surface before projecting laser images of said lumber elements, and wherein laser images of lumber elements are projected and the actual lumber elements are placed on said assembly surface before projecting laser images of said top plates.

7. A process for constructing roof trusses on an assembly surface, comprising the steps of:
   selecting a desired truss design from a number of designs stored in computer memory;
   transmitting the selected truss design to control means for laser light projectors;
   projecting laser images of the bottom plates for the selected truss design onto said assembly surface in a pattern identical to the bottom plates in the selected truss design;
   placing actual bottom plates over their respective images on said assembly surface;
   projecting laser images of lumber elements for the selected truss design onto said bottom plates and said assembly surface in a pattern identical to the lumber elements in the selected truss design;
   placing actual lumber elements over their respective images on said assembly surface;
   projecting laser images of top plates for the selected truss design onto said lumber elements in a pattern identical to the top plates in the selected truss design;
   placing actual top plates over their respective images in said lumber elements; and
   connecting the bottom plates, lumber elements, and top plates together to complete the desired truss.

8. The process of claim 7 including the preliminary steps of designing a roof truss on a computer and storing the design in computer memory.

9. A process for constructing roof trusses on an assembly surface, comprising the steps of:
   selecting a desired truss design from a number of designs stored in computer memory;
   alternatively projecting laser images of various truss components onto said assembly surface in the pattern of the desired truss design, and then placing jigs for truss components over their respective images on said assembly surface;
   placing actual truss components within their respective jigs; and
   connecting the truss components together to complete the desired truss.

10. A system for aiding in the assembling of roof trusses on an assembly surface, comprising:
    at least one laser light projector mounted above said assembly surface for projecting images of components of a desired roof truss onto said assembly surface; and
    control means electronically connected to said laser light projector for directing said laser light projector
    to project images of groups of said components onto said assembly surface.

11. The system of claim 10 further comprising design means electronically connected to said control means for designing the roof truss.

12. The system of claim 10 wherein said control means is programmable for directing said laser light projector to project images of said components in a predetermined sequence.

* * * * *